US012767142B2

(12) United States Patent
Patel et al.

(10) Patent No.: US 12,767,142 B2
(45) Date of Patent: Oct. 20, 2026

(54) VEHICLE CONTROL SYSTEMS FOR AUTOMATED LANE CHANGES

(71) Applicant: GM GLOBAL TECHNOLOGY OPERATIONS LLC, Detroit, MI (US)

(72) Inventors: Harsh Ketan Patel, New Hudson, MI (US); Paul A. Adam, Milford, MI (US); Shaun C. Bowman, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 18/910,760

(22) Filed: Oct. 9, 2024

(65) Prior Publication Data

US 2026/0097769 A1 Apr. 9, 2026

(51) Int. Cl.

*B60W 30/00* (2006.01)
*B60W 10/08* (2006.01)
*B60W 10/18* (2012.01)
*B60W 10/20* (2006.01)
*B60W 30/18* (2012.01)
*B60W 60/00* (2020.01)

(52) U.S. Cl.

CPC ...... *B60W 30/18163* (2013.01); *B60W 10/08* (2013.01); *B60W 10/18* (2013.01); *B60W 10/20* (2013.01); *B60W 60/001* (2020.02); *B60W 2420/403* (2013.01); *B60W 2554/4046* (2020.02); *B60W 2554/80* (2020.02)

(58) Field of Classification Search

CPC ......... B60W 30/18163; B60W 60/001; B60W 10/08; B60W 10/18; B60W 10/20; B60W 2554/80; B60W 2554/4046; B60W 2420/403

See application file for complete search history.

(56) References Cited

U.S. PATENT DOCUMENTS

2016/0176341 A1* 6/2016 Raghu ............. B60W 30/18154 348/148
2022/0315003 A1* 10/2022 Hong .............. B60W 30/18163

FOREIGN PATENT DOCUMENTS

DE 102005023185 A1 11/2006
DE 102016216941 A1 3/2017
DE 102018209910 A1 12/2019

OTHER PUBLICATIONS

German Office Action from counterpart DE1020241350970, dated Feb. 6, 2025.

* cited by examiner

*Primary Examiner* — Adnan M Mirza

(57) ABSTRACT

An example vehicle control system for automated lane changes includes front and rear cameras of a host vehicle, and a vehicle control module configured to identify a lane add location along a target travel path of the host vehicle, determine start and end point locations associated with the lane add location, determine a current merge commitment score according to a current location of the host vehicle between the start and end point locations, wherein the current merge commitment score decreases in response to decreasing distance between the host vehicle and the end point location, and in response to the current merge commitment score being less than a specified abort maneuver threshold, control an automated driving system of the host vehicle to abort a set automated lane change maneuver of the host vehicle into an added lane of the road at the lane add location.

14 Claims, 6 Drawing Sheets

VEHICLE CONTROL SYSTEMS FOR AUTOMATED LANE CHANGES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle control systems for controlling automated lane changes, including automated lane changes at a lane add portion of a road.

Some vehicles include vehicle cameras configured to obtain images from a front of the vehicle along a travel path of the vehicle. Automated driving systems may be configured to control acceleration, braking, etc. of vehicle according to objects in front of the vehicle. Autonomous driving may include merging from one lane of a road to another.

SUMMARY

An example vehicle control system for automated lane changes includes at least one front vehicle camera of a host vehicle, the at least one front vehicle camera configured to obtain images of a road including one or more lanes, a rear vehicle camera configured to obtain images of a target vehicle behind the host vehicle, and a vehicle control module configured to identify a lane add location along a target travel path of the host vehicle, determine a start point location associated with the lane add location and an end point location associated with the lane add location, obtain a current location of the host vehicle between the start point location and the lane add location, determine a current merge commitment score according to the current location of the host vehicle, wherein the current merge commitment score decreases in response to decreasing distance between the host vehicle and the end point location, compare the current merge commitment score to a specified abort maneuver threshold, wherein the specified abort maneuver threshold is indicative of a minimum distance from the end point location to safely perform an automated lane change maneuver before reaching the end point location, and in response to the current merge commitment score being less than the specified abort maneuver threshold, control an automated driving system of the host vehicle to abort a set automated lane change maneuver of the host vehicle into an added lane of the road at the lane add location.

In some examples, control of the automated driving system of the host vehicle includes at least one of controlling a motor of the host vehicle to automatically adjust acceleration of the host vehicle, controlling brakes of the host vehicle to automatically adjust braking of the host vehicle, or controlling a steering mechanism of the host vehicle to automatically adjust steering of the host vehicle.

3 In some examples, identifying the lane add location includes at least one of obtaining an image of the road via the front vehicle camera and processing the image to identify an additional lane added to the road at a further distance along the target travel path, or identifying the additional lane added to the road at a further distance along the target travel path via a road navigation map stored in memory and the current location of the host vehicle obtained from a global positioning system (GPS) receiver of the host vehicle.

In some examples, the vehicle control module is configured to obtain one or more images of the target vehicle behind the host vehicle, via the rear vehicle camera, and determine a rear vehicle intention score according to the one or more images, wherein the rear vehicle intention score is indicative of a likelihood of the target vehicle executing a passing maneuver with respect to the host vehicle, at the lane add location.

In some examples, determining the rear vehicle intention score includes determining a distance between the host vehicle and the target vehicle.

In some examples, determining the rear vehicle intention score includes determining a relative velocity between the host vehicle and the target vehicle.

In some examples, determining the rear vehicle intention score incudes recording lateral motion of the target vehicle relative to the one or more lanes of the road over a specified time period, and determining a vehicle stability value based on the recorded lateral motion of the target vehicle, wherein the vehicle stability value increases as lateral motion of the target vehicle within the specified time period increases.

In some examples, the vehicle control module is configured to compare the vehicle stability value to a specified pass intention threshold, and in response to the vehicle stability value exceeding the specified pass intention threshold, execute a lane offset maneuver of the host vehicle to move the host vehicle in a lateral direction towards an added lane of the road, prior to executing the set automated lane change maneuver, to deter a passing maneuver by the target vehicle using the added lane of the road.

In some examples, the vehicle control module is configured to compare the rear vehicle intention score to a specified pass intention threshold, and in response to the rear vehicle intention score being less than the specified pass intention threshold and the current merge commitment score being greater than the specified abort maneuver threshold, control the automated driving system of the host vehicle to execute the set automated lane change maneuver of the host vehicle into the added lane of the road at the lane add location.

In some examples, the vehicle control module is configured to compare the rear vehicle intention score to a specified pass intention threshold, and in response to the rear vehicle intention score being less than the specified pass intention threshold exceeding the specified pass intention threshold, execute a lane offset maneuver of the host vehicle to move the host vehicle in a lateral direction towards an added lane of the road, prior to executing the set automated lane change maneuver, to deter a passing maneuver by the target vehicle using the added lane of the road.

An example method for controlling automated lane changes of a host vehicle includes identifying, by a vehicle control module, a lane add location along a target travel path of the host vehicle along a road having one or more lanes, determining a start point location associated with the lane add location and an end point location associated with the lane add location, obtaining a current location of the host vehicle between the start point location and the lane add location, determining a current merge commitment score according to the current location of the host vehicle, wherein the current merge commitment score decreases in response to decreasing distance between the host vehicle and the end point location, comparing the current merge commitment score to a specified abort maneuver threshold, wherein the specified abort maneuver threshold is indicative of a minimum distance from the end point location to safely perform an automated lane change maneuver before reaching the end point location, and in response to the current merge commitment score being less than the specified abort maneuver threshold, controlling an automated driving system of the host vehicle to abort a set automated lane change maneuver of the host vehicle into an added lane of the road at the lane add location.

In some examples, control of the automated driving system of the host vehicle includes at least one of controlling a motor of the host vehicle to automatically adjust acceleration of the host vehicle, controlling brakes of the host vehicle to automatically adjust braking of the host vehicle, or controlling a steering mechanism of the host vehicle to automatically adjust steering of the host vehicle.

In some examples, identifying the lane add location includes at least one of obtaining an image of the road via a front vehicle camera and processing the image to identify an additional lane added to the road at a further distance along the target travel path, or identifying the additional lane added to the road at a further distance along the target travel path via a road navigation map stored in memory and the current location of the host vehicle obtained from a global positioning system (GPS) receiver of the host vehicle.

In some examples, the method includes obtaining one or more images of a target vehicle behind the host vehicle, via a rear vehicle camera, and determine a rear vehicle intention score according to the one or more images, wherein the rear vehicle intention score is indicative of a likelihood of the target vehicle executing a passing maneuver with respect to the host vehicle, at the lane add location.

In some examples, determining the rear vehicle intention score includes determining a distance between the host vehicle and the target vehicle.

In some examples, determining the rear vehicle intention score includes determining a relative velocity between the host vehicle and the target vehicle.

17 In some examples, determining the rear vehicle intention score incudes recording lateral motion of the target vehicle relative to the one or more lanes of the road over a specified time period, and determining a vehicle stability value based on the recorded lateral motion of the target vehicle, wherein the vehicle stability value increases as lateral motion of the target vehicle within the specified time period increases.

In some examples, the method includes comparing the vehicle stability value to a specified pass intention threshold, and in response to the vehicle stability value exceeding the specified pass intention threshold, executing a lane offset maneuver of the host vehicle to move the host vehicle in a lateral direction towards an added lane of the road, prior to executing the set automated lane change maneuver, to deter a passing maneuver by the target vehicle using the added lane of the road.

In some examples, the method includes comparing the rear vehicle intention score to a specified pass intention threshold, and in response to the rear vehicle intention score being less than the specified pass intention threshold and the current merge commitment score being greater than the specified abort maneuver threshold, controlling the automated driving system of the host vehicle to execute the set automated lane change maneuver of the host vehicle into the added lane of the road at the lane add location.

In some examples, the method includes comparing the rear vehicle intention score to a specified pass intention threshold, and in response to the rear vehicle intention score being less than the specified pass intention threshold exceeding the specified pass intention threshold, executing a lane offset maneuver of the host vehicle to move the host vehicle in a lateral direction towards an added lane of the road, prior to executing the set automated lane change maneuver, to deter a passing maneuver by the target vehicle using the added lane of the road.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
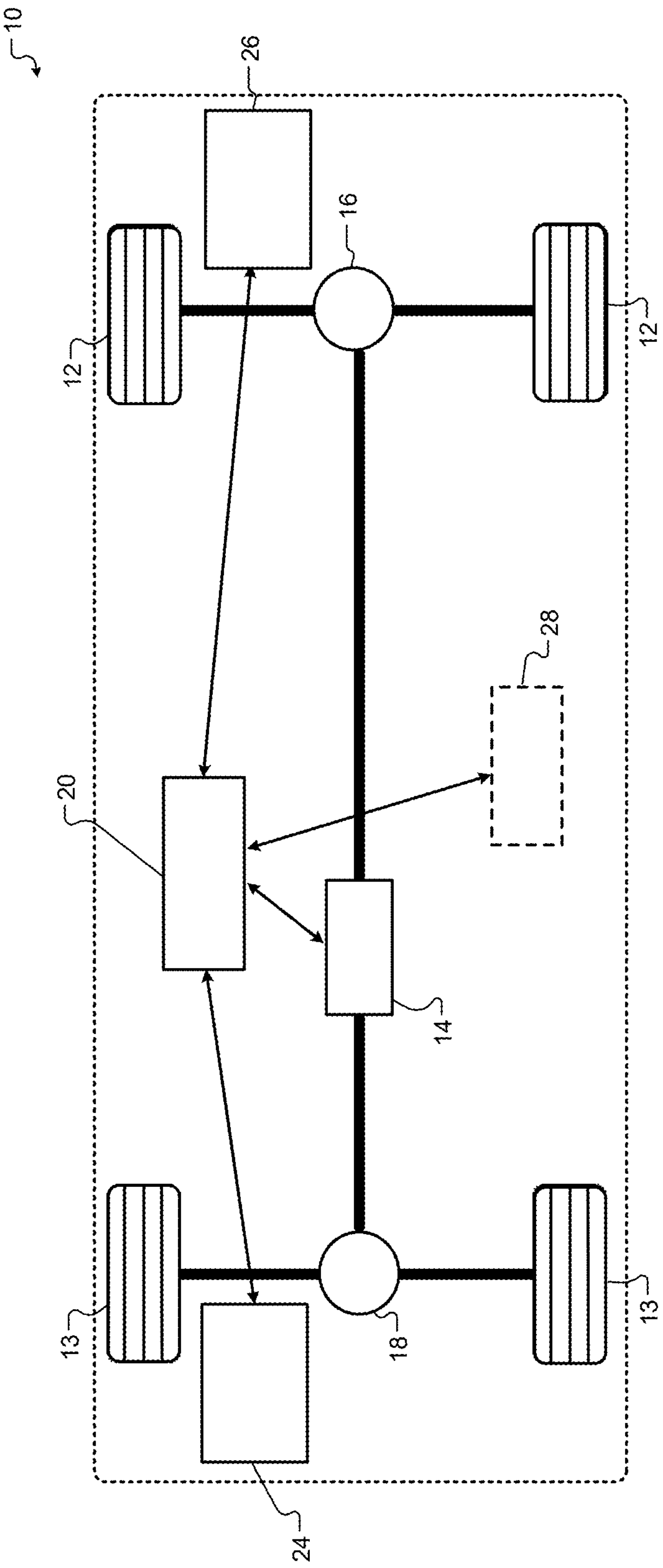
FIG. 1 is a diagram of an example vehicle including front and rear cameras for use in controlling automated lane changes of the vehicle.

In some example embodiments, a vehicle control system is configured to detect and mitigate cut around maneuvers from other target vehicles travelling behind a host vehicle, during an automated lane change application for the host vehicle. An example vehicle control algorithm may formulate an automated behavioral sequence (e.g., controlling vehicle blinker activation, lateral motion of the vehicle, a heading change, a curvature change, etc.), for executing an automated lane change at a lane add point on a road.

Driving actions of a rear target vehicle (e.g., a vehicle traveling behind the host vehicle on a road), may be compared relative to a driving navigation plan formulated for the host vehicle. The correlation of rear target vehicle driving activity and the host vehicle navigation may be used to determine if a lateral motion should be initiated by host vehicle, to laterally offset the host vehicle in the direction of the added lane before the added lane is physically available for entry by the host vehicle, to discourage a cut around maneuver by the rear target vehicle (e.g., the rear target vehicle attempting to immediately pass the host vehicle at a higher speed as soon as minimal space is available for the rear target vehicle in the added lane of the road).

In some examples, a vehicle control module facilitates the ability to correlate driving behavior of rear following target vehicle to a driving motion plan of a host vehicle, which may be formulated by host vehicle's planning system in proximity to lane add and/or bifurcation points (e.g., points on the road where a new lane is added, such as an offramp, or a lane splits in two directions such as a highway interchange). An original motion plan of the host vehicle may be adjusted based on detected rear target behavior (e.g., "steering from behind").

Example vehicle control methods may include physically initiating lateral motion of the host vehicle to discourage a passing attempt by a rear vehicle, such as preparing for transversing into an approaching added lane before the lane is physically adjacent to a current position of the host vehicle. This may discourage rear road actors from cutting around the host vehicle prior to the host vehicle's automated lane change.

For example, a behavioral sequence for the automated lane change at the lane add point may be correlated with the host vehicle trajectory by the vehicle control module, including a sequence of actions to accomplish the automated lane change at the lane add location. The vehicle control module may use cameras, sensors, other vehicle data, road or lane data, etc., to determine a degree of freedom of the host vehicle for choosing a next automated driving maneuver.

In some examples, a comparison of a rear target vehicle's driving action relative to a navigation plan formulated for the host vehicle may include correlating behavioral stability of the rear follower target vehicle with respect to the host vehicle's automated driving sequence. The correlation with the formulated navigation plan of the host vehicle may be used to trigger cut around detection of a rear follower target vehicle, based on based on lateral and longitudinal motion in vicinity of a lane add point. The vehicle control module may be configured to perform model output calculations based on behaviors described herein (or others), to detect a cut around maneuver attempt by the rear target vehicle.

For example, a method for discouraging a cut around maneuver by the rear vehicle may include using correlation data as described above to induce lateral motion of the host vehicle, offsetting in the direction of the added lane before the added lane is physically available for entry by the host vehicle (e.g., before the host vehicle is physically adjacent to the added lane).

The rear vehicle target behavior may be correlated with the modified host vehicle navigation plan (e.g., including the induced lateral motion of the host vehicle in the current lane). The host vehicle and target vehicle timing may be compared for a next sequential sub-maneuver execution, and the vehicle control module may be configured to abort the planned automated lane change maneuver in situations where the rear target vehicle is being overly aggressive (e.g., where the rear target vehicle continues to exhibit detected high acceleration, lateral motion or relative velocity, even after the host vehicle has initiated lateral motion to deter a pass attempt).

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, a vehicle camera, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, wheel position sensors, location sensors such as global positioning system (GPS) antennas, etc.). Some sensors may be configured to monitor current motion of the vehicle, acceleration of the vehicle, steering torque, etc.

As shown in FIG. 1, the vehicle 10 includes a front vehicle camera 26, configured to capture images of a field of view in front of the vehicle 10. The field of view may be a wide field of view (such as a least a thirty degree field of view, a forty-five degree field of view, a sixty degree field of view, a ninety degree field of view, etc.), in order to capture objects on sides of a road on which the vehicle 10 is traveling.

The vehicle 10 includes a rear vehicle camera 24, which may be configured to capture images in a field of view from a rear of the vehicle 10. For example, the rear vehicle camera 24 may capture images of a target rear vehicle following the vehicle 10, to determine driving behavior of the rear vehicle (such as relative velocity of the rear vehicle, lateral motion of the rear vehicle, whether the rear vehicle is going to attempt a passing maneuver on the vehicle 10, etc.).

As shown in FIG. 1, the vehicle 10 includes an optional side vehicle camera 28. In various implementations, the vehicle 10 may include more or less of any of these optional vehicle cameras. The vehicle 10 may include any suitable laser, lidar sensor, etc., which is used to detect objects around the vehicle 10.

In some example embodiments, a vehicle object detector may be configured to detect a closest in-path vehicle (CIPV) (e.g., another vehicle in front of a current driving path of the vehicle 10), a vulnerable road user (VRU) (e.g., a pedestrian or cyclist), etc. The vehicle control module 20 may be configured to control movement of the vehicle 10 based on a detected CIP target vehicle, detected driving behavior of a rear target vehicle, etc., such as by increasing or decreasing automated acceleration of the vehicle 10 (e.g., by controlling power or torque output by a motor), automatically applying brakes of the vehicle 10 (such as in response to a crash imminent braking event), adjusting an automated steering mechanism of the vehicle 10 to execute a lane change maneuver, etc.

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

The vehicle 10 also includes a user interface. The user interface may include any suitable displays (such as on a dashboard, a console, or elsewhere), a touchscreen or other input devices, speakers for generation of audio, etc.

Figure 2:
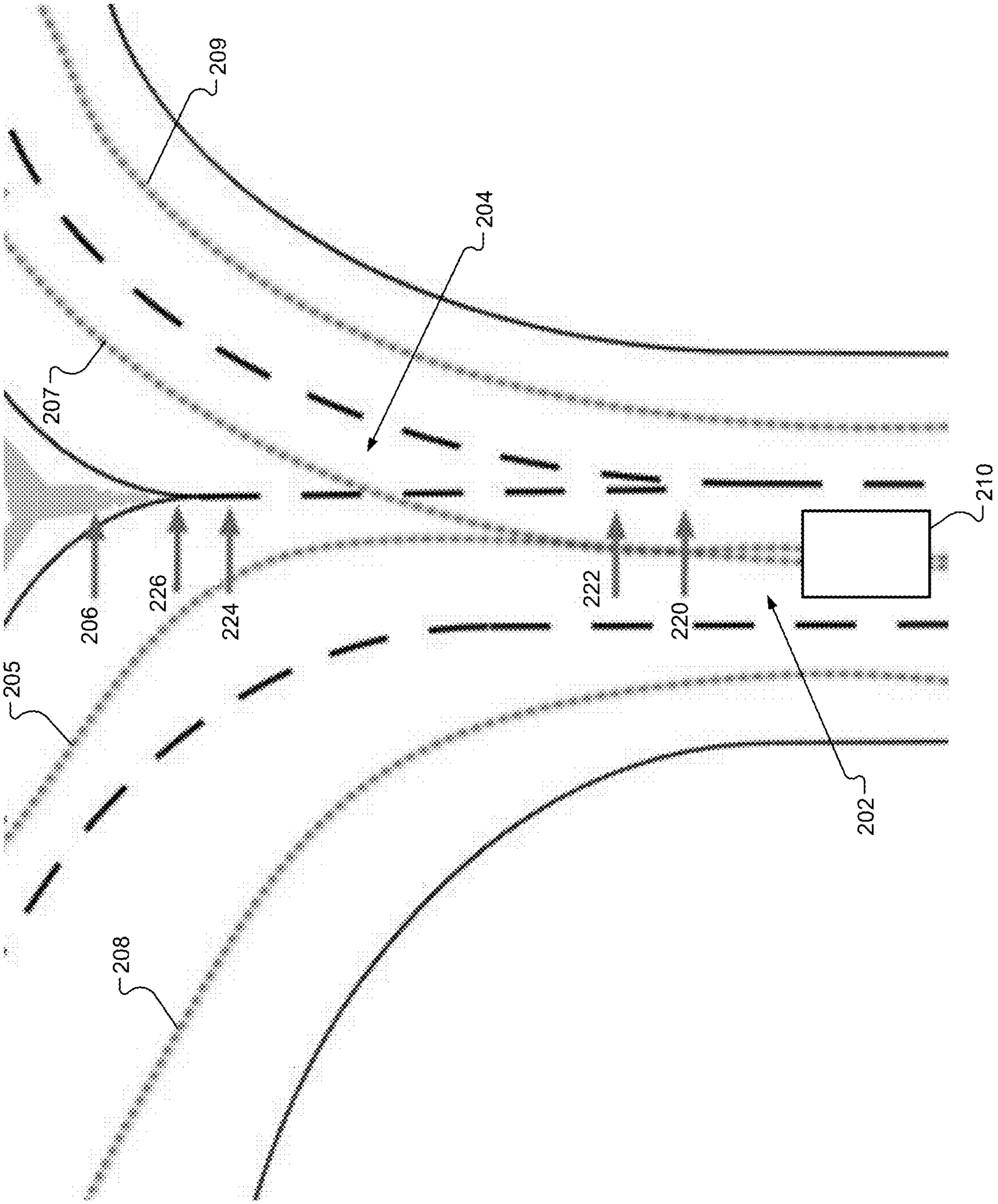
FIG. 2 is an example diagram of a vehicle navigating a lane add location of a road.

FIG. 2 is an example diagram of a vehicle 210 navigating a lane add location of a road. As shown in FIG. 2, the vehicle 210 is traveling in a current travel lane 202 of a road. The road includes an added lane 204 ahead of the vehicle 210. For example, the current travel lane 202 may split into two lanes at a highway interchange, an offramp lane may be added adjacent the current travel lane 202, etc.

Depending on a navigation plan for automated driving, the vehicle 210 may follow a first travel route 207 where the vehicle 210 automatically executes a lane change maneuver into the added lane 204. Alternatively, as discussed further below, the vehicle 210 may abort the lane change maneuver (e.g., due to a rear vehicle passing the vehicle 210 from behind, due to the vehicle 210 approaching an end point 226 of the lane add location where the vehicle 210 may otherwise hit a barrier 206, etc.), and follow a second travel route 205 which maintains the vehicle 210 in the current lane without merging to the added lane 204. Other example travel routes 208 and 209 are illustrated in FIG. 2 as well, which may be used if the vehicle 210 is traveling in a different lane than the current travel lane 202.

A vehicle control module of the vehicle 210 may control the automated lane change based on a current location of the vehicle 210 relative to one or more points associated with the lane add location. For example, an absolute start point 220 may be associated with a location where the added lane 204 first starts to expand away from the current travel lane 202, and an absolute end point 226 may be associated with a location where the added lane 204 separates from current travel lane 202, beyond which the vehicle 210 could go off the road or hit a barrier 206.

In order to provide a cushion for enhanced automated driving safety, the vehicle control module may offset the start and points of the lane add location, such as a start point 222 (e.g., an absolute start point with a safety distance offset of ten feet, fifty feet, etc.), and an end point 224 (e.g., an absolute end point with a safety distance offset of ten feet, fifty feet, etc.).

The vehicle 210 may detect the added lane 204 based on any suitable lane detection techniques, such as capturing images of the added lane 204 using a front camera, comparing a current location of the vehicle 210 obtained via a global positioning system (GPS) receiver to a stored navigation map which indicates the upcoming added lane 204, etc.

Figure 3:
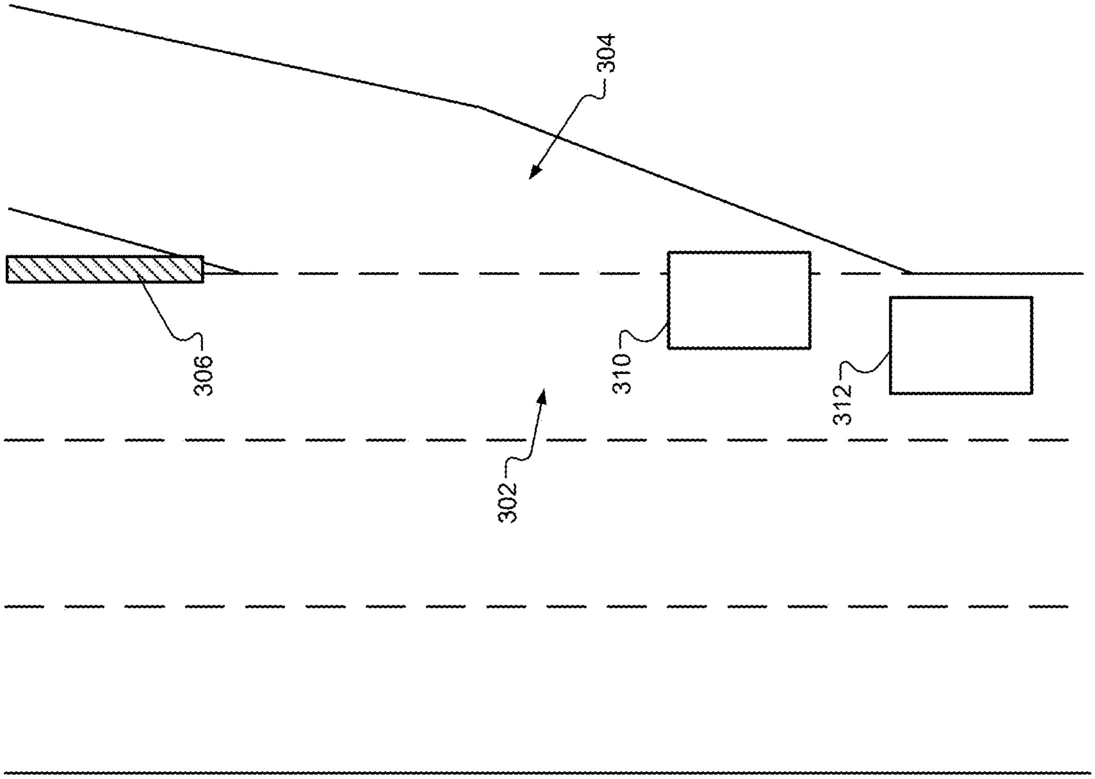
FIG. 3 is another example diagram of a host vehicle navigating a lane add location of a road with a target vehicle behind the host vehicle.

FIG. 3 is another example diagram of a host vehicle navigating a lane add location of a road with a target vehicle 312 behind the host vehicle 310. As shown in FIG. 3, the host vehicle 310 may attempt to execute an automated lane change from a current travel lane 302 to an added lane 304, before reaching a barrier 306.

The host vehicle 310 may obtain driving behavior of the rear vehicle 312 (such as via a rear camera of the host vehicle), to predict whether the rear vehicle 312 is likely to attempt a pass maneuver of the host vehicle 310 to enter the added lane 304. As described herein, the host vehicle 310 may optionally implement lateral movement within the current travel lane 302, in a direction towards the added lane 304, before there is enough space for the host vehicle 310 to actually enter the added lane 304. This lateral movement may deter the rear vehicle 312 from attempting an immediate passing maneuver in the added lane 304 around the host vehicle 310, as soon as the rear vehicle 312 reaches the added lane 304.

Referring again to FIG. 2, in some examples the host vehicle 210 may determine a lane change commitment score based on, among other factors, a current location of the host vehicle 210 between the start point 222 and the end point 224 of the lane add location. For example, the host vehicle 210 may set a commitment score to a maximum value (e.g., a value of one) prior to the vehicle 210 reaching the start point 222.

After the vehicle 210 passes the start point 222, the lane change commitment score may reduce (e.g., as a percentage of distance travelled), until the vehicle 210 reaches the end point 224, where the lane change commitment score may be at a minimum (e.g., zero). For example, the vehicle control module may calculate degrees of freedom of the vehicle 210 to select different driving maneuvers.

The degrees of freedom value may represent options for the vehicle 210 to stay in the current travel lane 202, or merge into the added lane 204. The degrees of freedom may be at a lowest point when the vehicle 210 is pointed directly at the barrier 206 (e.g., during a steering change of the vehicle 210 from the current travel lane 202 to the added lane 204).

In some examples, the degrees of freedom value may be considered as a factor which makes it less likely for the vehicle 210 to abort a planned lane change maneuver while the vehicle 210 is between the start point 222 and the end point 224 (e.g., as compared to locations prior to the start point 222). The commitment score may be implemented to make the vehicle 210 progressively less likely to abort the planned lane change as the vehicle 210 moves further through the lane change maneuver.

Some example embodiments may use a linear normalization and classification method:

$$x_i = \frac{k_i x_i - \min(K)}{\max(K) - \min(K)}$$

where weights include $k_{cal}$=calibration constants, and $K=[k_{cal,k}, k_{cal,j}, \ldots k_{cal,n}]$. Example model output may include $O_{raw}=[k_{cal,k}*X_i, k_{cal,j}*X_j, \ldots k_{cal,n}*X_n]$ and O=sum (linearNorm($O_{raw}$)). An example scenario classification may include alt_host_not_clear=O<calibration [0 . . . 1], or min[ttc]<calibration 2, is equal to True.

Figure 4:
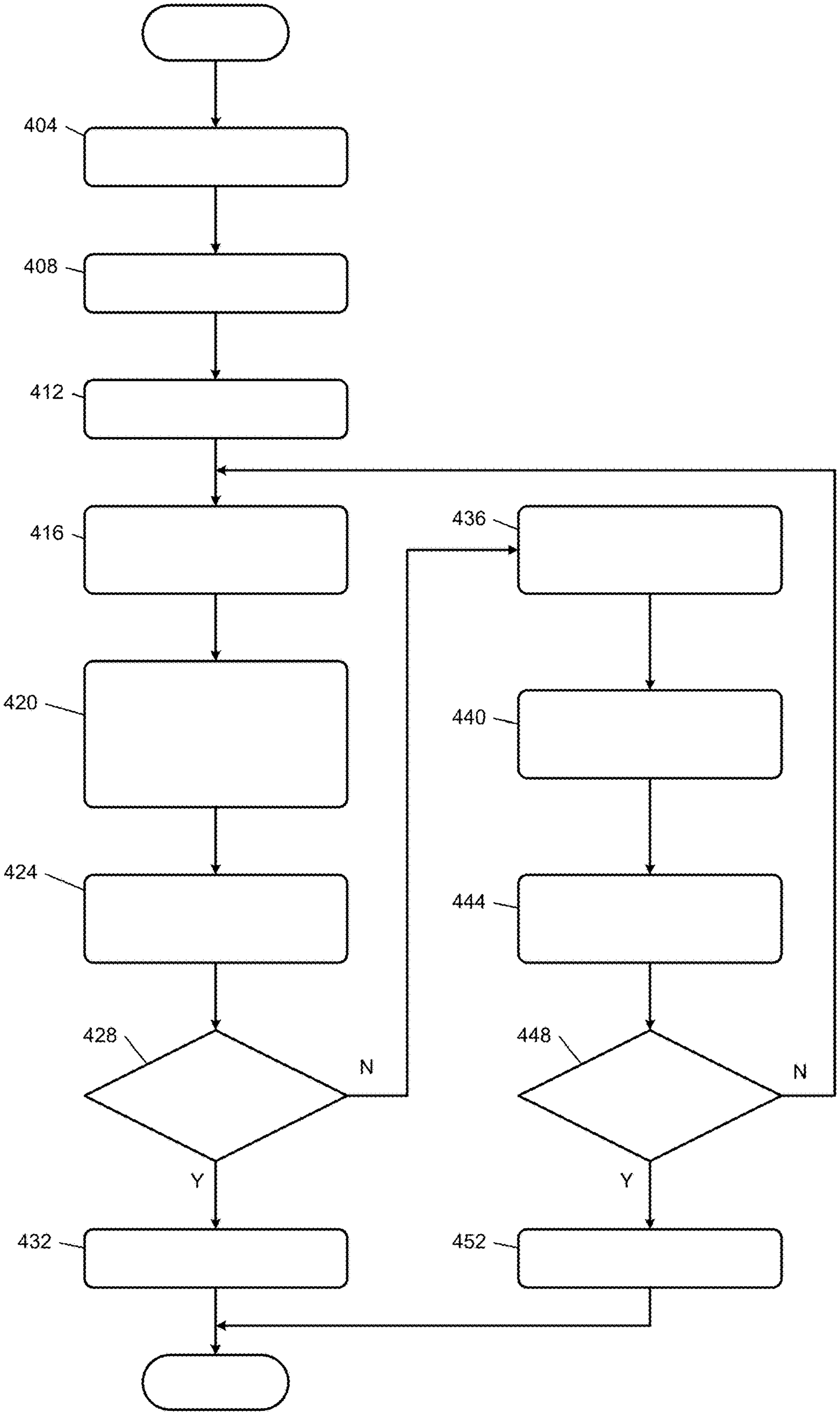
FIG. 4 is a flowchart depicting an example process for controlling automated lane changes for a host vehicle.

FIG. 4 is a flowchart depicting an example process for controlling automated lane changes for a host vehicle. The process illustrated in FIG. 4 may be performed by, for example, the vehicle control module 20 of FIG. 1. At 404, the process begins by identifying an upcoming lane add location.

At 408, the vehicle control module is configured to determine a start point and an end point of the lane add location. Control then sets a commitment score to a maximum value at 412, such as a value of one. At 416, the vehicle control module is configured to obtain a current location of vehicle between the start point and end point.

Control then updates a value of the commitment score at 420, based on a distance travelled by the vehicle between the start point and the end point. At 424, the vehicle control module is configured to compare the commitment score to an abort maneuver threshold. If the abort maneuver score is below the abort maneuver threshold at 428, control aborts the lane change maneuver at 432.

If the above maneuver score is above the specified abort maneuver threshold at 428, control proceeds to 436 to obtain updated rear vehicle data via the rear camera. The vehicle control module is configured to optionally execute a lateral offset motion of the host vehicle at 440. Further example details of the lateral offset motion are described further below with reference to FIG. 5.

At 444, the vehicle control module is configured to determine a rear vehicle intention score. Further example details of determining the rear vehicle intention score are described below with reference to FIG. 6.

At 448, the vehicle control module is configured to determine whether the intention score is less than a merge safety threshold (e.g., indicative that it is safe to execute the merge maneuver into the added lane without a likelihood of the rear vehicle attempting to pass the host vehicle at the same time). If the intention score is not greater than the merge safety threshold at 448, control returns to 416 to obtain a new current location of the vehicle between the start point and end point of the lane add location. This may be updated periodically (e.g., every 10 milliseconds, every 100 milliseconds, every 500 milliseconds, every 1 second, etc.), until the vehicle either executes or aborts the automated lane change maneuver into the added lane. If the intention score is less than the merge safety threshold value at 448, control may then proceed to 452 to execute and automated lane change maneuver into the added lane.

In some examples, the vehicle control module may be configured to execute a function which combines five (or more or less) individual host vehicle and target vehicle parameters into a final overall objective function. Each parameter may have a weight (e.g., calibration) that is multiplied by a raw score, and then divided by the sum of all weights. This may result in a potential range between 0 and 1, irrespective individual weighting.

A cost-function may be defined which results in an overall model output value. If this value falls below a minimum threshold, the raw output may be false. For example, if the value is too low, the vehicle control module may block the automated lane change.

A redundant path may also set output to false (e.g., block a merge maneuver). This redundancy may be triggered if the minimum time to longitudinal proximity across all fused targets is too low. A third path may be set to false. This third path may be triggered if the host vehicle is in a failed state while split lane follow is enabled (e.g., a navigation map-based failure).

The main path (e.g., cost function path mentioned above) may include five (or more or less) individual contributions, which are split along “Host” vehicle and “Target” vehicle parameters. Host vehicle parameters may be related to the geometry of the lane change maneuver and the position of the host vehicle along the lane change maneuver. Target vehicle parameters may be related to the surrounding vehicles. All parameters can be weighted relative to the others, or individually turned off, by calibrations.

Figure 5:
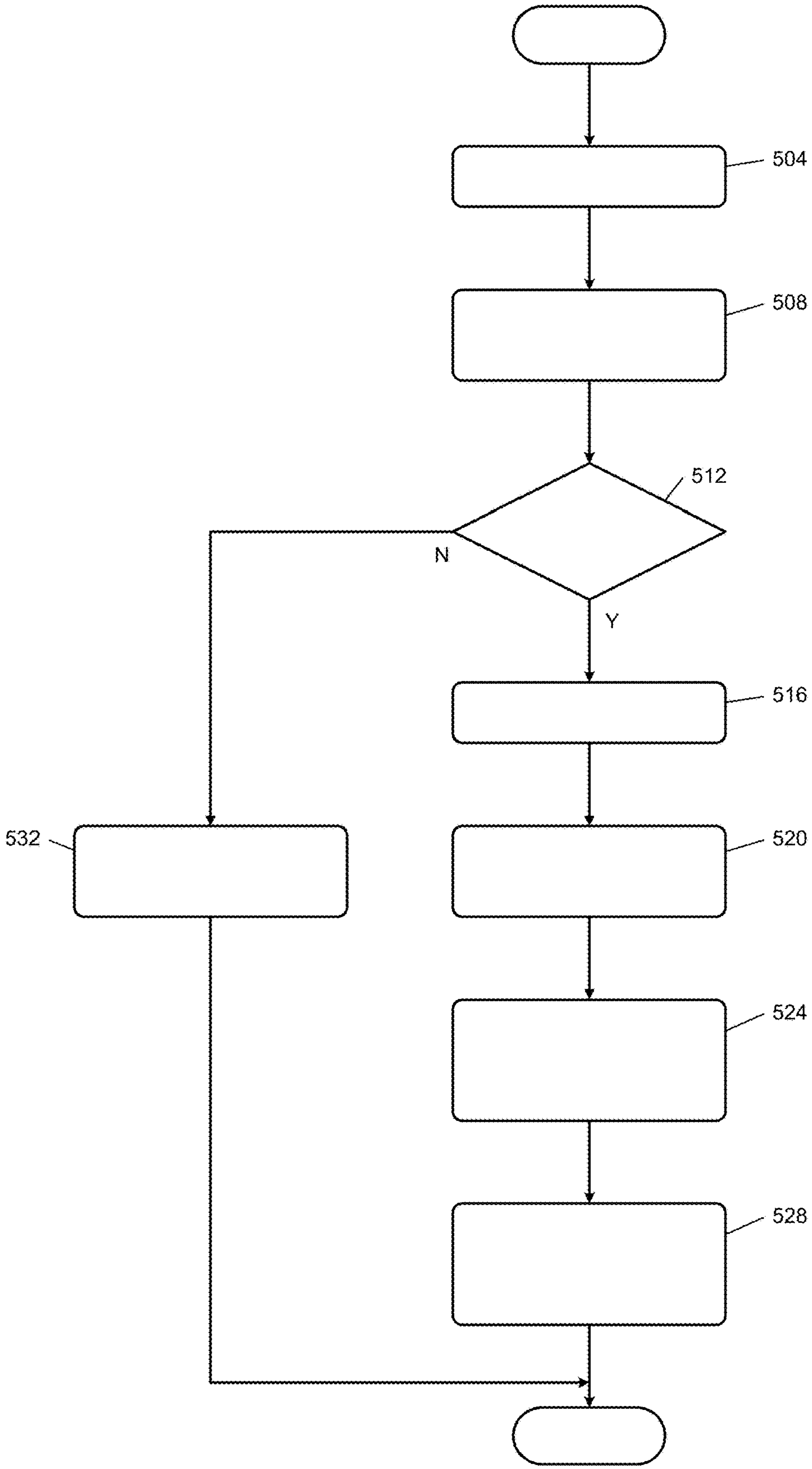
FIG. 5 is a flowchart depicting an example process for selectively executing a lateral offset of a host vehicle to deter a passing maneuver by a target rear vehicle.

FIG. 5 is a flowchart depicting an example process for selectively executing a lateral offset of a host vehicle to deter a passing maneuver by a target rear vehicle. The process illustrated in FIG. 5 may be performed by, for example, the vehicle control module 20 of FIG. 1. At 504, the process begins by identifying a rear vehicle location via a rear camera of the host vehicle.

At 508, the vehicle control module is configured to determine whether the rear vehicle is approaching a side of the host vehicle. If the rear vehicle is not currently approaching a side of the host vehicle at 512, control may proceed to 532 to execute the automated lane change into the added lane without a prior lateral offset maneuver.

If the rear vehicle is currently approaching or posing a passing threat to a side of the host vehicle at 512, control proceeds to 516 to determine a current lane width of a travel lane of the host vehicle. The vehicle control module then determines a position of the host vehicle relative to the host lane at 520.

At 524, the vehicle control module is configured to calculate a magnitude of the lateral offset based on the lane width and host position (e.g., to determine how much the host vehicle should move sideways within its current lane in order to deter a rear vehicle from attempting a passing maneuver). At 528, the vehicle control module is configured to execute the lateral offset maneuver (e.g., my moving laterally within the current lane of the host vehicle) prior to implementing an actual merge into the added lane, in order to deter the rear vehicle from attempting a passing maneuver.

In some examples, the vehicle control module may be configured to first identify if route navigation is enabled, and whether a lane change is impending at an upcoming lane add location. The vehicle control module may then determine if a threat (e.g., approaching rear vehicle) is present in the direction of the intended lateral offset to make the automated lane change to the added lane.

If threat is present, the vehicle control module may apply a lateral offset to discourage a cut around maneuver form the rear vehicle. The magnitude of the lateral offset may be a function of the lane width and relative lateral position of the host vehicle in the host lane (e.g., via a look up table). The vehicle control module may apply a sign to the magnitude of the lateral offset, depending on the intended lane change side.

Figure 6:
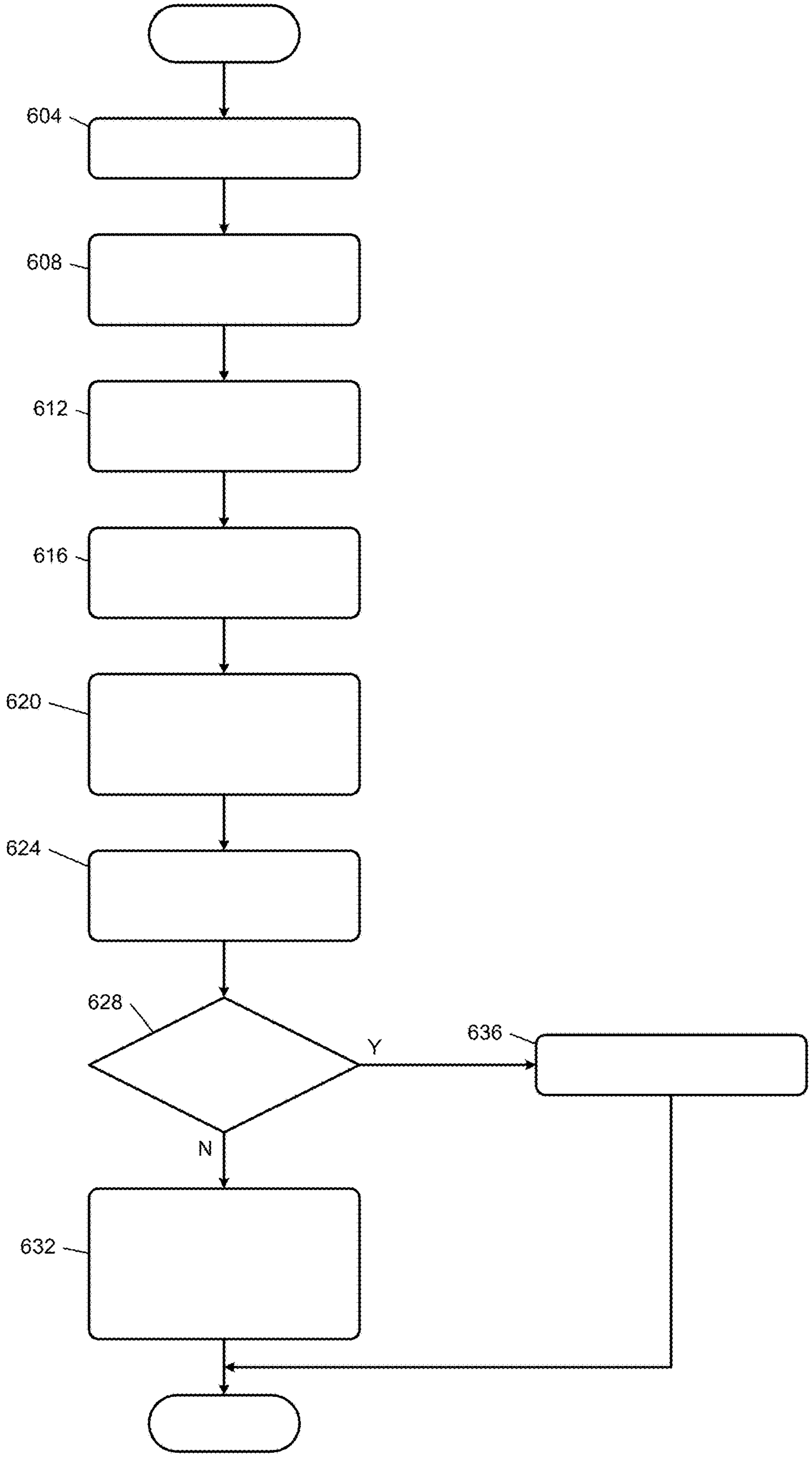
FIG. 6 is flowchart depicting an example process for determining a rear vehicle pass intention score.

FIG. 6 is flowchart depicting an example process for determining a rear vehicle pass intention score. The process illustrated in FIG. 6 may be performed by, for example, the vehicle control module 20 of FIG. 1. At 604, the process begins by obtaining data of a rear vehicle via a rear camera of the host vehicle.

At 608, the vehicle control module is configured to calculate a distance between the rear vehicle and the host vehicle. Control then determines a relative velocity between the rear vehicle and the host vehicle at 612. The vehicle control module is configured to access a recent history of lateral movement of the vehicle at 616.

At 620, the vehicle control module is configured to determine a stability value for the rear vehicle based on the history of lateral movement (e.g., within a specified recent time period such as the last five seconds, the last ten seconds, the last thirty seconds, etc.). The vehicle control module compares the stability value to a pass intention threshold at 624. For example, if the rear vehicle is moving far from the center of the lane, or moving back and forth in the lane multiple times, or moving side to side quickly in the lane, this may suggest that the rear vehicle is impatient and planning to attempt a passing maneuver as soon as possible.

If the stability value is above a pass intention threshold at 628, control proceeds to 636 to set the rear vehicle pass intention to true (or a maximum value). If the stability value is below the pass intention threshold at 628, control proceeds to 632 to calculate the rear vehicle pass intention score based on a combination (e.g., weighed combination) of the distance between the rear vehicle and the host vehicle, the relative velocity of the host vehicle and the rear vehicle, and the lateral stability value of the rear vehicle.

In some examples, the vehicle control module may be configured to first find the a "worst case target" rear vehicle. The worst case rear vehicle may be defined as target rear vehicle having a minimum time to close the relative longitudinal distance between the host vehicle and the target vehicle, for rear vehicle targets that are rearward and moving towards the host vehicle, meet a minimum fusion confidence level, are within a maximum relative lateral position.

The vehicle control module may be configured to calculate a time to closest proximity, which provides a measure of the worst-case target according to its longitudinal time to close and proximity. The parameter may be calculated using a two-dimensional ramp.

The relative velocity of the rear target vehicle may be calculated in longitudinal and lateral directions relative to the host vehicle. The orthogonal velocities may be squared and summed, and the square root taken to provide an overall relative velocity magnitude. The overall magnitude may be applied to a look-up ramp, which may be defined as starting at 0 if the relative velocity is greater than a calibration threshold (e.g., worst case), and ending at 1 with a relative velocity of 0 (e.g., best case).

The stability of the rear vehicle target may be calculated to determine a stability of lateral movement within the lane of the rear vehicle target. A target with high stability may be interpreted as predictable (e.g., a good score of 1 indicating low lateral movement with the lane), and a rear vehicle target having a lot of lateral motion within the lane may be interpreted as unpredictable (e.g., a bad score of 0).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle control system for automated lane changes, the vehicle control system comprising:
- at least one front vehicle camera of a host vehicle, the at least one front vehicle camera configured to obtain images of a road including one or more lanes;
- a rear vehicle camera configured to obtain images of a target vehicle behind the host vehicle; and
- a vehicle control module configured to:
  - identify a lane add location along a target travel path of the host vehicle;
  - determine a start point location associated with the lane add location and an end point location associated with the lane add location;
  - obtain a current location of the host vehicle between the start point location and the end point location;
  - determine a current merge commitment score according to the current location of the host vehicle, wherein the current merge commitment score decreases in response to decreasing distance between the host vehicle and the end point location;
  - obtain one or more images of the target vehicle behind the host vehicle, via the rear vehicle camera;
  - determine a rear vehicle intention score according to the one or more images, a distance between the host vehicle and the target vehicle, and a relative velocity between the host vehicle and the target vehicle, wherein the rear vehicle intention score is indicative of a likelihood of the target vehicle executing a passing maneuver with respect to the host vehicle, at the lane add location;
  - compare the current merge commitment score to a specified abort maneuver threshold, wherein the specified abort maneuver threshold is indicative of a minimum distance from the end point location to safely perform an automated lane change maneuver before reaching the end point location; and
  - in response to the current merge commitment score being less than the specified abort maneuver threshold, control an automated driving system of the host vehicle to abort a set automated lane change maneuver of the host vehicle into an added lane of the road at the lane add location.

2. The vehicle control system of claim 1, wherein control of the automated driving system of the host vehicle includes at least one of:
- controlling a motor of the host vehicle to automatically adjust acceleration of the host vehicle;
- controlling brakes of the host vehicle to automatically adjust braking of the host vehicle; or
- controlling a steering mechanism of the host vehicle to automatically adjust steering of the host vehicle.

3. The vehicle control system of claim 1, wherein identifying the lane add location includes at least one of:
- obtaining an image of the road via the front vehicle camera and processing the image to identify an additional lane added to the road at a further distance along the target travel path; or
- identifying the additional lane added to the road at a further distance along the target travel path via a road navigation map stored in memory and the current location of the host vehicle obtained from a global positioning system (GPS) receiver of the host vehicle.

4. The vehicle control system of claim 1, wherein determining the rear vehicle intention score incudes:
- recording lateral motion of the target vehicle relative to the one or more lanes of the road over a specified time period; and
- determining a vehicle stability value based on the recorded lateral motion of the target vehicle, wherein the vehicle stability value increases as lateral motion of the target vehicle within the specified time period increases.

5. The vehicle control system of claim 4, wherein the vehicle control module is configured to:
- compare the vehicle stability value to a specified pass intention threshold; and
- in response to the vehicle stability value exceeding the specified pass intention threshold, execute a lane offset maneuver of the host vehicle to move the host vehicle in a lateral direction towards an added lane of the road, prior to executing the set automated lane change maneuver, to deter a passing maneuver by the target vehicle using the added lane of the road.

6. The vehicle control system of claim 1, wherein the vehicle control module is configured to:
- compare the rear vehicle intention score to a specified pass intention threshold; and
- in response to the rear vehicle intention score being less than the specified pass intention threshold and the current merge commitment score being greater than the specified abort maneuver threshold, control the automated driving system of the host vehicle to execute the set automated lane change maneuver of the host vehicle into the added lane of the road at the lane add location.

7. The vehicle control system of claim 1, wherein the vehicle control module is configured to:

compare the rear vehicle intention score to a specified pass intention threshold; and in response to the rear vehicle intention score being less than the specified pass intention threshold exceeding the specified pass intention threshold, execute a lane offset maneuver of the host vehicle to move the host vehicle in a lateral direction towards an added lane of the road, prior to executing the set automated lane change maneuver, to deter a passing maneuver by the target vehicle using the added lane of the road.

8. A method for controlling automated lane changes of a host vehicle, the method comprising:

identifying, by a vehicle control module, a lane add location along a target travel path of the host vehicle along a road having one or more lanes;

determining a start point location associated with the lane add location and an end point location associated with the lane add location;

obtaining a current location of the host vehicle between the start point location and the end point location;

determining a current merge commitment score according to the current location of the host vehicle, wherein the current merge commitment score decreases in response to decreasing distance between the host vehicle and the end point location;

obtain one or more images of a target vehicle behind the host vehicle, via a rear vehicle camera;

determine a rear vehicle intention score according to the one or more images, a distance between the host vehicle and the target vehicle, and a relative velocity between the host vehicle and the target vehicle, wherein the rear vehicle intention score is indicative of a likelihood of the target vehicle executing a passing maneuver with respect to the host vehicle, at the lane add location;

comparing the current merge commitment score to a specified abort maneuver threshold, wherein the specified abort maneuver threshold is indicative of a minimum distance from the end point location to safely perform an automated lane change maneuver before reaching the end point location; and in response to the current merge commitment score being less than the specified abort maneuver threshold, controlling an automated driving system of the host vehicle to abort a set automated lane change maneuver of the host vehicle into an added lane of the road at the lane add location.

9. The method of claim 8, wherein control of the automated driving system of the host vehicle includes at least one of:

controlling a motor of the host vehicle to automatically adjust acceleration of the host vehicle;

controlling brakes of the host vehicle to automatically adjust braking of the host vehicle; or controlling a steering mechanism of the host vehicle to automatically adjust steering of the host vehicle.

10. The method of claim 8, wherein identifying the lane add location includes at least one of:

obtaining an image of the road via a front vehicle camera and processing the image to identify an additional lane added to the road at a further distance along the target travel path; or identifying the additional lane added to the road at a further distance along the target travel path via a road navigation map stored in memory and the current location of the host vehicle obtained from a global positioning system (GPS) receiver of the host vehicle.

11. The method of claim 8, wherein determining the rear vehicle intention score incudes:

recording lateral motion of the target vehicle relative to the one or more lanes of the road over a specified time period; and determining a vehicle stability value based on the recorded lateral motion of the target vehicle, wherein the vehicle stability value increases as lateral motion of the target vehicle within the specified time period increases.

12. The method of claim 11, further comprising:

comparing the vehicle stability value to a specified pass intention threshold; and in response to the vehicle stability value exceeding the specified pass intention threshold, executing a lane offset maneuver of the host vehicle to move the host vehicle in a lateral direction towards an added lane of the road, prior to executing the set automated lane change maneuver, to deter a passing maneuver by the target vehicle using the added lane of the road.

13. The method of claim 8, further comprising:

comparing the rear vehicle intention score to a specified pass intention threshold; and in response to the rear vehicle intention score being less than the specified pass intention threshold and the current merge commitment score being greater than the specified abort maneuver threshold, controlling the automated driving system of the host vehicle to execute the set automated lane change maneuver of the host vehicle into the added lane of the road at the lane add location.

14. The method of claim 8, further comprising:

comparing the rear vehicle intention score to a specified pass intention threshold; and in response to the rear vehicle intention score being less than the specified pass intention threshold exceeding the specified pass intention threshold, executing a lane offset maneuver of the host vehicle to move the host vehicle in a lateral direction towards an added lane of the road, prior to executing the set automated lane change maneuver, to deter a passing maneuver by the target vehicle using the added lane of the road.

* * * * *